(12) United States Patent
Wells et al.

(10) Patent No.: US 7,595,126 B2
(45) Date of Patent: Sep. 29, 2009

(54) PEM FUEL CELL ASSEMBLY FORMED OF MODULAR SUB-ASSEMBLIES

(75) Inventors: Allan R. Wells, Rochester, NY (US); Gary J. De Angelis, Spencerport, NY (US); Seth D. Valentine, Livonia, NY (US)

(73) Assignees: Delphi Technologies, Inc., Troy, MI (US); General Motors Corporation, Detroit, MI (US)

( * ) Notice: Subject to any disclaimer, the term of this patent is extended or adjusted under 35 U.S.C. 154(b) by 307 days.

(21) Appl. No.: 10/723,648

(22) Filed: Nov. 26, 2003

(65) Prior Publication Data

US 2005/0112442 A1  May 26, 2005

(51) Int. Cl.
  H01M 8/24 (2006.01)
  H01M 2/08 (2006.01)
  H01M 2/00 (2006.01)
  H01M 2/02 (2006.01)
  H01M 10/14 (2006.01)

(52) U.S. Cl. ............ 429/34; 429/35; 429/36; 429/30; 29/623.2; 29/623.1; 29/730

(58) Field of Classification Search ......... 429/34, 429/35, 36, 30; 29/623.2, 623.1, 730
See application file for complete search history.

(56) References Cited

U.S. PATENT DOCUMENTS

| | | | |
|---|---|---|---|
| 6,071,635 A * | 6/2000 | Carlstrom, Jr. | 429/34 |
| 6,180,274 B1 * | 1/2001 | Yoshimoto et al. | 429/34 |
| 6,230,494 B1 | 5/2001 | Botti et al. | |
| 6,410,180 B1 * | 6/2002 | Cisar et al. | 429/41 |
| 6,423,896 B1 | 7/2002 | Keegan | |
| 6,451,469 B1 | 9/2002 | Nakamura et al. | |
| 6,485,852 B1 | 11/2002 | Miller et al. | |
| 6,492,043 B1 * | 12/2002 | Knights et al. | 429/13 |
| 6,500,574 B2 | 12/2002 | Keegan | |
| 6,509,113 B2 | 1/2003 | Keegan | |
| 6,551,734 B1 | 4/2003 | Simpkins et al. | |
| 6,562,496 B2 | 5/2003 | Faville et al. | |
| 6,608,463 B1 | 8/2003 | Kelly et al. | |
| 6,609,582 B1 | 8/2003 | Botti et al. | |
| 6,613,468 B2 | 9/2003 | Simpkins et al. | |
| 6,613,469 B2 | 9/2003 | Keegan | |
| 6,620,535 B2 | 9/2003 | Mukerjee et al. | |
| 6,638,654 B2 * | 10/2003 | Jankowksi et al. | 429/26 |
| 6,761,991 B2 * | 7/2004 | Frisch et al. | 429/35 |
| 2001/0049044 A1 | 12/2001 | Molter | |
| 2002/0055027 A1 | 5/2002 | Inoue et al. | |
| 2002/0110720 A1 * | 8/2002 | Yang | 429/35 |

(Continued)

*Primary Examiner*—Patrick Ryan
*Assistant Examiner*—Angela J. Martin
(74) *Attorney, Agent, or Firm*—Paul L. Marshall

(57) ABSTRACT

A method for forming a fuel cell assembly including the pre-final-assembly step of forming a plurality of fuel cell sub-assembly modules, each module including a predetermined number of individual fuel cell repeating units, for example, ten. Each module may be leak and performance tested and certified prior to inclusion in the final fuel cell stack, thus limiting potential rework to only an individual module and only before assembly of the final stack. Preferably, each module is assembled on an assembly fixture having alignment rods, using a combination of resilient gasketing and RTV to seal between the elements. The assembled module is then placed under compression while the silicone is cured.

16 Claims, 5 Drawing Sheets

U.S. PATENT DOCUMENTS

| | | | |
|---|---|---|---|
| 2003/0076110 A1* | 4/2003 | Wang et al. | 324/444 |
| 2004/0053099 A1* | 3/2004 | Franklin et al. | 429/30 |
| 2004/0053100 A1* | 3/2004 | Stanley et al. | 429/30 |
| 2004/0101735 A1 | 5/2004 | Wells et al. | |
| 2004/0231142 A1 | 11/2004 | Wells et al. | |
| 2005/0064266 A1* | 3/2005 | Abdou et al. | 429/35 |
| 2005/0091838 A1* | 5/2005 | Frank et al. | 29/623.2 |
| 2005/0244703 A1* | 11/2005 | Osenar et al. | 429/35 |
| 2006/0127735 A1* | 6/2006 | Sabin et al. | 429/35 |
| 2008/0070081 A1 | 3/2008 | Franklin et al. | |

* cited by examiner

PEM FUEL CELL ASSEMBLY FORMED OF MODULAR SUB-ASSEMBLIES

TECHNICAL FIELD

The present invention relates to fuel cells incorporating a proton exchange membrane (PEM); more particularly, to a PEM fuel cell assembly comprising a stack of individual fuel cell units; and most particularly, to method and apparatus for forming a sealed stack sub-assembly module comprising a plurality of individual fuel cell units, a plurality of such sub-assembly modules being stackable to form the fuel cell assembly.

BACKGROUND OF THE INVENTION

Fuel cell assemblies employing proton exchange membranes are well known. Such assemblies typically comprise a stack of individual fuel cells, each fuel cell having an anode and a cathode separated by a catalytic proton exchange membrane (PEM). The fuel cells in the stack are connected in series electrically to provide a desired voltage output. Gaseous fuel, in the form of hydrogen or hydrogen-containing mixtures such as "reformed" hydrocarbons, flows adjacent to a first side of the membrane, and oxygen, typically in the form of air, flows adjacent to the opposite side of the membrane. Hydrogen is catalytically oxidized at the anode-membrane interface, and the resulting proton, H+, migrates through the membrane to the cathode-membrane interface where it combines with anionic oxygen, $O^{31\ 2}$, to form water. Protons migrate only in those areas of the fuel cell in which the anode and cathode are directly opposed across the membrane. Electrons flow from the anode through an external circuit to the cathode, doing electrical work in a load in the circuit.

A complete fuel cell assembly typically comprises a plurality of individual fuel cells connected in series to form one or more fuel cell stacks. In a preferred embodiment, a bipolar plate assembly, comprising an anode, a cathode, and having formed passages for the flow of hydrogen to the anode and air to the cathode, is disposed adjacent an element known in the art as a Membrane Electrode Assembly (MEA). A repeating pattern of alternating bipolar plate assemblies and MEA elements form a stacked fuel cell assembly.

Preferably, a Gas Diffusion Layer (GDL) element is also included between each bipolar plate assembly and an adjacent MEA to promote the distribution of gas uniformly over both the anode and the cathode.

At the outer edges of the stacked fuel cell assembly, the bipolar plate assemblies and MEA elements are sealed together by gasket elements to contain the reactant gases and/or coolant within the assembly. Thus, an important aspect of forming a stacked fuel cell assembly is preventing leakage between the plate assemblies.

Another important consideration is precisely aligning the multitude of bipolar plate assemblies. In the prior art, a fuel cell stack typically is formed by assembling, one at a time, alternating bipolar plate assemblies and MEA elements to form a fuel cell unit. A full stack for some applications comprising about 60 individual fuel cell units, and for some other applications up to 200 units. Typically, the bipolar plate assemblies and MEAs are bonded along their outer edges with silicone rubber or other inert, curable sealant, making any subsequent disassembly difficult, time-consuming, and hazardous to the individual stack elements.

It is known to provide alignment holes in the stack and to use an assembly fixture having alignment pins. A problem arises in this arrangement however, in that the assembly can- not be tested for perimeter leaks until all the elements have been assembled together and the sealant cured. If a leak is detected, the stack must be disassembled down to the point of the leak to fix the leak. Once a stack has passed the leak test, it is performance tested. Again, if a bipolar plate assembly or MEA is found defective, the stack must be disassembled and reworked.

What is needed is means for intermediate testing during assembly of a fuel cell stack to limit the amount of reworking necessary when any defect is found.

It is a principal object of the present invention to reduce rework labor in assembling a fuel cell stack.

It is a further object of the present invention to reduce the cost of manufacturing a fuel cell assembly.

SUMMARY OF THE INVENTION

Briefly described, a method for assembling a fuel cell stack includes the pre-final-assembly step of forming a plurality of sealed fuel cell sub-assembly modules, each module including a predetermined number of individual, sealed fuel cell repeating units, for example, ten. Each module may be leak and performance tested and certified prior to inclusion in the final fuel cell stack, thus limiting potential rework to only an individual module and only before assembly of the final stack. Preferably, each module is assembled on an assembly fixture having alignment rods, using a combination of resilient gasketing and room temperature vulcanized rubber (RTV) to seal between the elements. The assembled module is then placed under compression while the silicone is cured.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
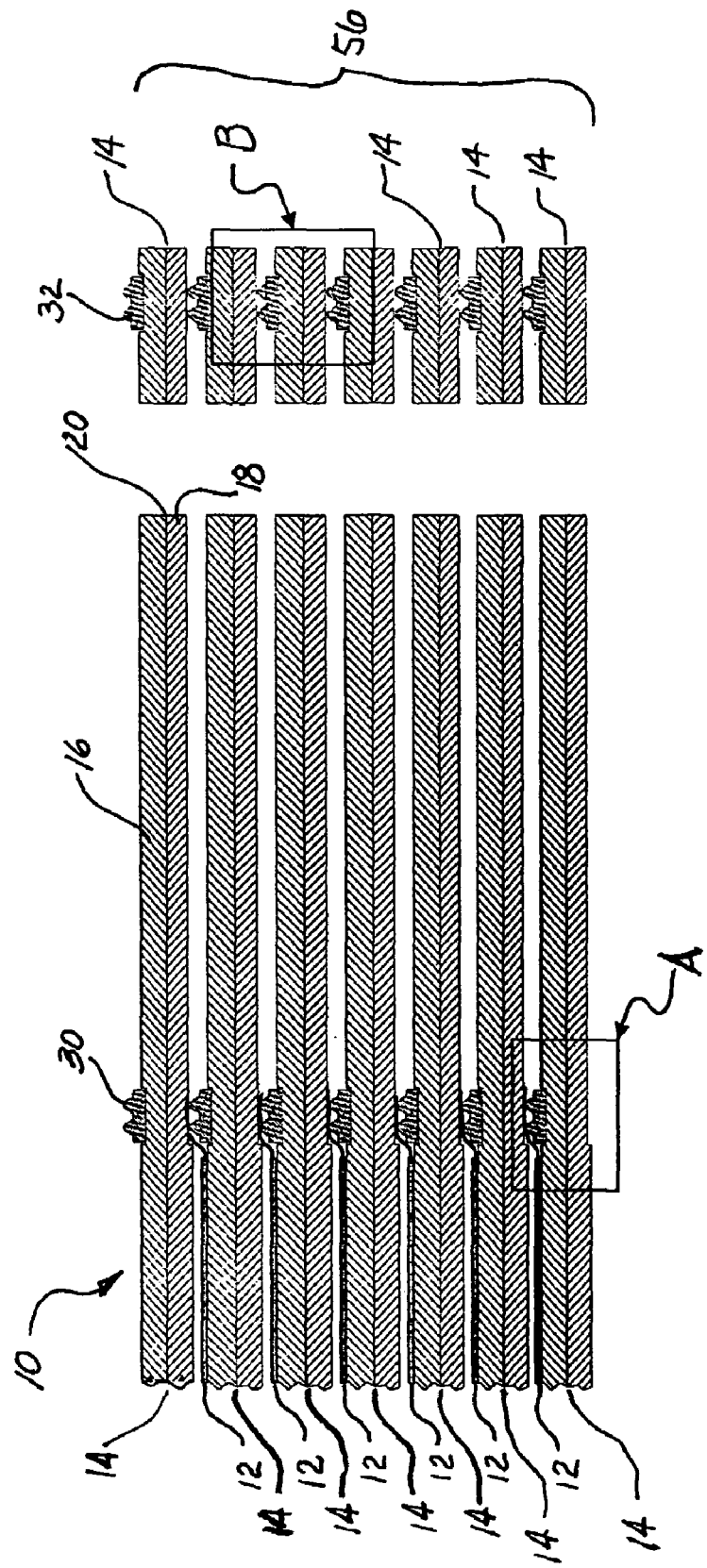
FIG. 1 is an elevational cross-sectional view of a portion of a PEM fuel cell of the present invention showing the various components in an uncompressed state.
Figure 2:
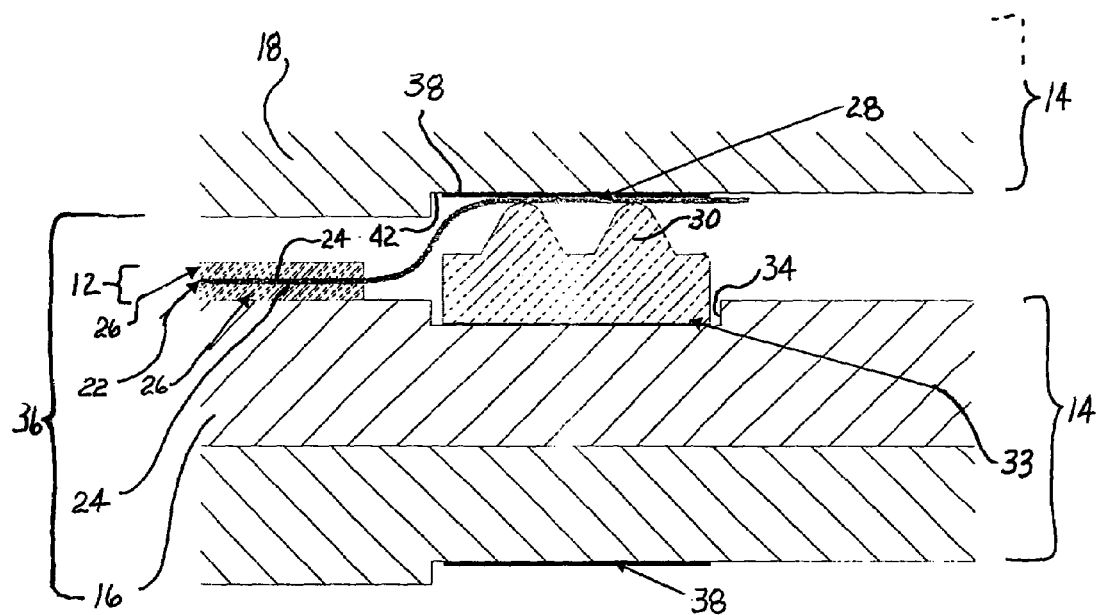
FIG. 2 is an elevational cross-sectional view of a portion of the PEM fuel cell shown in box A in FIG. 1, showing the interface between the MEA, bipolar plate assembly and gasket and seal.
Figure 3:
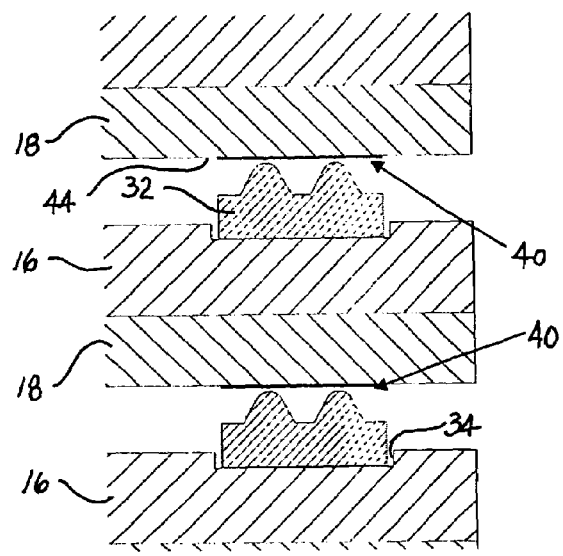
FIG. 3 is an elevational cross-sectional view of a portion of the PEM fuel cell shown in box B in FIG. 1 showing the bonding interface between the MEA and bipolar plate assembly.

Referring to FIGS. 1-3, a portion of a PEM fuel cell stack 10 of the present invention is shown at a stage prior to stack compression. Stack 10 comprises a layered series of MEA elements 12 interspersed among an alternating series of bipolar plate assemblies 14. Anodes 16 and cathodes 18 are bonded together at interface 20 to form bipolar plate assemblies 14. A five layer MEA element 12, as shown in FIGS. 1 and 2, comprises outer gas diffusion layers 26, catalyst layers 24, and center membranes 22. Alternately, a three layer MEA element could be used with separate gas diffusion layers. The three or five layer MEA element as described herein preferably consists of a central membrane made of Nafion®, available from E.I duPont de Nemours and Company of Wilmington, Del.

As best shown in FIG. 2, Each MEA element 12 extends between cathode 18 of a first bipolar plate assembly 14 and anode 16 of an identical and adjacent second bipolar plate assembly 14. Elements 30 and 32 of elastomeric gasket 31 (FIGS. 2-4) are disposed in shallow grooves 34 in anodes 16 and bonded 33 to the anodes using a preparation and bonding process similar to that disclosed in commonly owned, pending patent application Ser. No. 10/256,770. Elastomeric gasket 31 thus provide a seal for preventing leakage of reactive gases between the plate assemblies. In addition, element 32 of elastomeric gasket 31 is also bonded to adjacent cathode 18 via portion 40 of seal gasketing element 38 to bond the bipolar plates together and, once seal gasketing element 38 is cured, to thereby form a modular assembly of MEA elements 12 and bipolar plate assemblies 14.

Referring to FIG. 2, for purposes of the present invention, the sequence of a bipolar plate assembly, gasketing elements and MEA element defines a "fuel cell unit" 36. In the present invention, edge portion 28 of MEA element 12 extends beyond gas diffusion layers 26 and is disposed between elastomeric gasket element 30 and cathode 18. Edge portion 28 does not extend between elastomeric gasketing element 32 and cathode 18. Seal gasketing element 38 is disposed, as a thin film, on surfaces 42 and 44 of cathode 18. A preferred and well known method for applying a thin film of the composition is screen printing, by which means complex patterns of the seal are readily provided as may be needed to accommodate complex sealing surfaces of fuel cell elements. Other methods of application, for example, roller application, are of course within the scope of the invention. The thickness of seal gasketing element 38 is preferably on the order of 0.005 inch or less, and preferably between about 0.001 inch and about 0.003 inch, and are readily formed in a single printing pass. Seal gasketing element 38 is preferably formed of a cross-linked silicone composition, for example, an organopolysiloxane such as 3140 RTV after first reducing the RTV with OS30. Both the 3140 RTV and the OS30 reducing agent are manufactured by Dow Corning Corporation of Midland, Mich. The seal gasketing element is then cured in place by atmospheric moisture and/or an incorporated activator to form a thin non-fluid elastomeric layer after curing.

Seal gasketing elements 38 are applied to cathodes 18, as described above, and are not allowed to cure prior to assembly of the of the bipolar plate assemblies to the MEA elements. After assembly of the bipolar plates to the MEA elements is completed, the plates are compressed together. Then, seal gasketing elements 38, and particularly portion 40, are allowed to cure while the plates are under compression to form fuel cell sub-assembly module 56.

Figure 4:
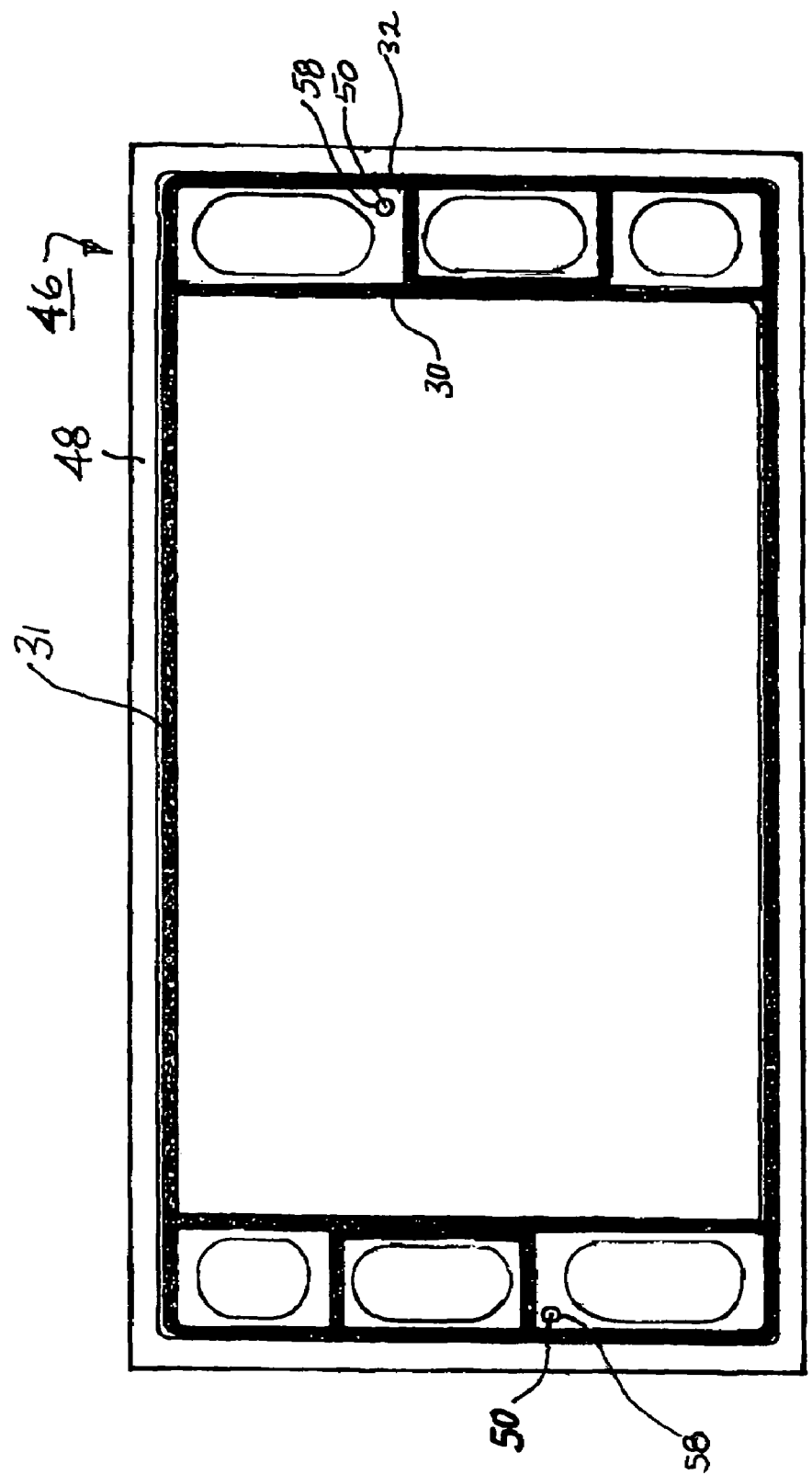
FIG. 4 is a plan view of a fuel cell stack positioned on an alignment fixture in accordance with the invention, with the top pressure plate of the fixture removed to show the top surface of the bipolar plate assembly.
Figure 5:
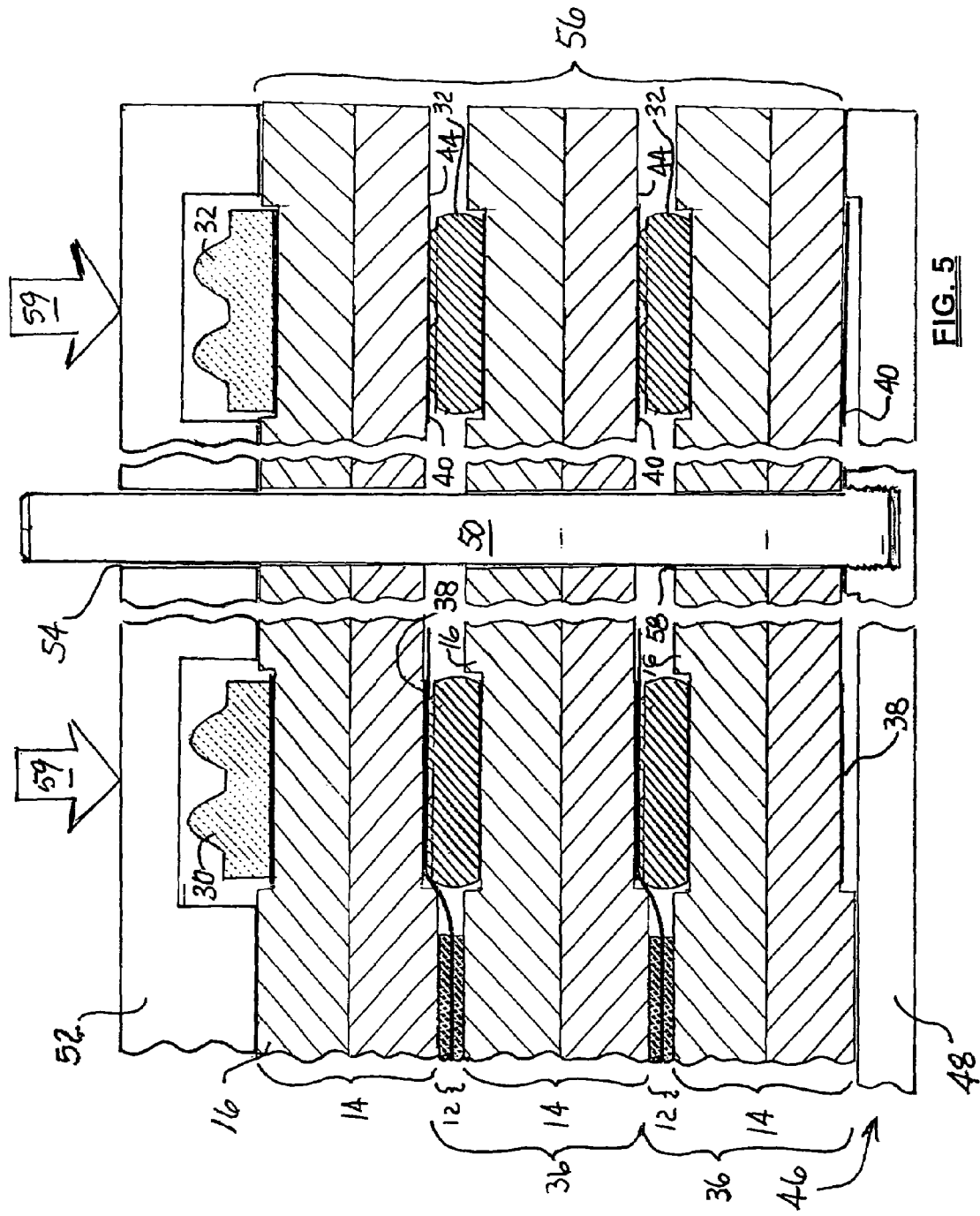
FIG. 5 is an elevational cross-sectional view of a portion of a multiple cell fuel cell sub-assembly module after assembly in an alignment and compressional fixture in accordance with the invention.
Figure 6:
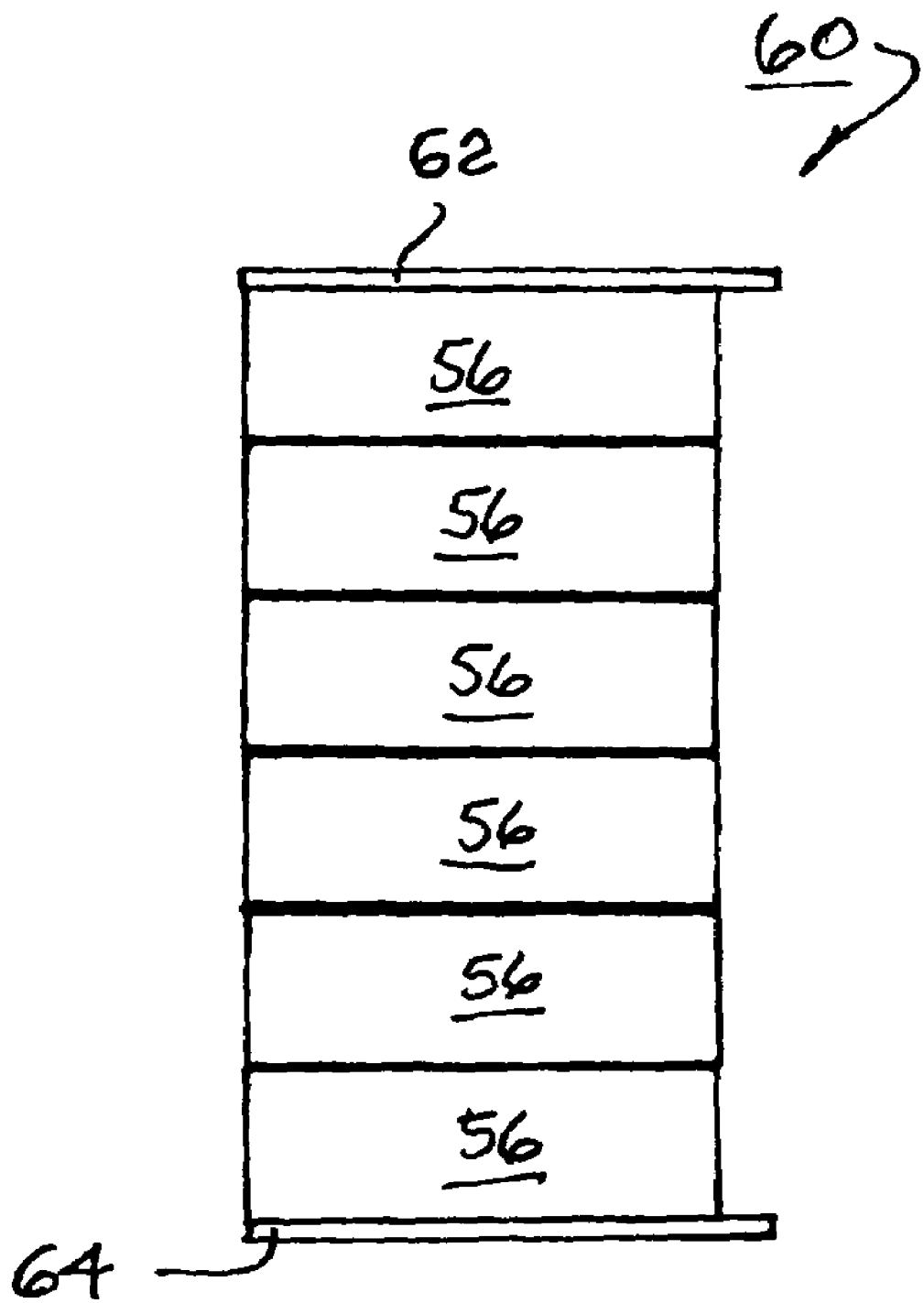
FIG. 6 is a schematic elevational view of a complete fuel cell assembly comprising a plurality of fuel cell sub-assembly modules in accordance with the invention.

Referring to FIGS. 4 through 6, an assembly fixture 46 for assembling a fuel cell stack module 56 in accordance with the invention includes a base plate 48 for receiving the stack and at least two spaced-apart alignment rods 50 (one is shown) secured at their lower ends to base plate 48, as by threading, and extending outwards orthogonally from base plate 48. A pressure plate 52 includes bores 54 for slidably fitting onto rods 50. The stack module 56 comprises a plurality of bipolar plate assemblies 14, each having bores 58 for accepting rods 50 such that upon assembly all plate assemblies 14 are highly aligned.

Prior to stacking of the bipolar plate assemblies 14 and MEA elements 12 onto assembly fixture 46, seal gasketing element 38 is applied to surfaces 42 and 44 of cathode 18 (FIGS. 2 and 3). Then, once the bipolar plate assemblies are stacked and compressed by applying pressure 59 via pressure plate 52, seal gasketing elements 38, and particularly portion 40 of seal gasketing element 38, are permitted to cure to form a non-fluid elastomeric layer and to bond elastomeric gasketing element 32 to cathode surface 44 to thereby form fuel cell subassembly module 56 comprised of a series of bonded together fuel cell units 36.

In a currently preferred method in accordance with the invention for forming a PEM fuel cell assembly 60 (FIG. 6), a plurality of fuel cell sub-assembly modules 56 are pre-assembled, each module 56 being formed as follows (shown in FIG. 5):

a) select n+1 number of bipolar plate assemblies 14 and n number of MEA elements 12, n being the number of fuel cell units 36 desired in each sub-assembly module 56, each bipolar plate assembly having pre-formed elastomeric gasket 31 on anodes 16 (in the example shown in FIG. 5, n=2);

b) apply a film of curable seal gasketing element 38 onto surfaces 42 and 44 of cathodes 18 of n+1 of the bipolar plate assemblies 14;

c) install onto base plate 48 of fixture 46 a bipolar plate assembly 14, having cathode 18 of the bipolar plate assembly facing plate 48 with rods 50 extending though bores 58;

d) install an MEA element 12 onto the bipolar plate assembly 14 on the fixture 46 with edge portion 28 of MEA element 12 in contact with elastomeric gasketing element 30 of the previously installed bipolar plate assembly thereby forming a fuel cell unit 36;

e) install onto fixture 46 bipolar plate assembly 14 (with seal gasketing element 38 on surfaces 42 and 44) having cathode 18 of the bipolar plate assembly facing the previously installed bipolar plate assembly;

f) repeat step d;

g) repeat steps e) and f) for the remaining number of selected bipolar plate assemblies 14 and the remaining number of selected MEA elements 12 to form a fuel cell sub-assembly modular stack 56 having n fuel cell units;

h) install pressure plate 52 onto module 56;

i) exert suitable pressure 59 from a pressure source (not shown) onto pressure plate 52 while curing seal gasketing element 38; and j) remove pressure 59 from plate 52, remove plate 52 from rods 50, and remove module 56 from assembly fixture 46.

Module 56 may then be submitted to leak and performance certification testing. Additional modules 56 are pre-assembled as above. A complete PEM fuel cell assembly 60 (FIG. 6) containing m fuel cell units 36 may then be formed by stacking x modules 56 together, with appropriate MEA elements and seal gasketing elements therebetween, where m=xn. Typically, specialized end plates 62, 64 are included, bounding the stack of modules 56, to complete the fuel cell assembly 60. In the schematic example shown in FIG. 6, x=6.

While the example of module 56 shown in FIG. 5 comprises 2 fuel cell units 36 including 3 bipolar plate assemblies and 2 MEA elements, it is understood that a greater number of bipolar plate assemblies (and the required number of MEA elements) can be stacked together in assembly fixture 46 to form fuel cell sub-assembly 56.

While the method of forming module 56 as described above includes the steps of installing bipolar plate assemblies having their cathodes oriented to face the base plate of the fixture, it is understood that module 56 can be stacked in the fixture with the anodes of the bipolar plate assemblies facing the base plate.

The method as recited assumes that elastomeric gasket 31 is formed and cured prior to this pre-assembly method, and that seal gasketing element 38 is applied and cured during the method. Of course, within the scope of the invention, the roles may be reversed, elastomeric gasket 31 being applied and cured during the method and seal gasketing element 38 being formed and cured prior to the method.

The reliability of such an assembly formed in accordance with the invention is very high compared with a comparable assembly as formed in accordance with the prior art, because each of the x modules is tested for leaks prior to their being conjoined to form the completed fuel cell assembly.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for forming a fuel cell assembly, comprising the steps of:
   a) forming a fuel cell sub-assembly module containing at least two bonded together fuel cell units, said at least two fuel cell units each including an anode, a cathode, and a membrane electrode assembly, wherein said at least two fuel cell units are bonded together using at least one elastomeric gasket and at least one gasketing element, and wherein one of said at least one elastomeric gasket or said at least one gasketing element is cured prior to bonding together said at least two fuel cell units, and the other of said at least one elastomeric gasket and said at least one gasketing element is cured during the bonding together of said at least two fuel cell units;
   b) testing said sub-assembly module; and
   c) joining together a plurality of sub-assembly modules to form said fuel cell assembly.

2. A method in accordance with claim 1 wherein each of said sub-assembly modules comprises a plurality of bipolar plates assemblies interspersed with a plurality of membrane electrode assembly elements.

3. A method in accordance with claim 1 wherein said forming step for each of said sub-assembly modules includes the steps of:
   a) providing an assembly fixture having at least one alignment element for receiving fuel cell components:
   b) selecting n+1 number of bipolar plate assemblies and n number of membrane electrode assembly elements, each bipolar plate assembly having an anode and a cathode, wherein n is the number of said plurality of fuel cell units desired in said sub-assembly module;
   c) providing said at least one elastomeric gasket on one of said anode and cathode of n+1 bipolar plate assemblies;
   d) providing said at least one gasketing element on the other of said anode and said cathode of n+1 bipolar plate assemblies, at least one of said at least one elastomeric gasket and said at least one gasketing element including a curable liquid rubber material;
   e) installing onto said assembly fixture one of said n+1 bipolar plate assemblies, said alignment element engaging said one of said n+1 bipolar plate assemblies;
   f) installing onto said assembly fixture a membrane electrode assembly element into contact with said just-installed bipolar plate assembly;
   g) installing onto said assembly fixture another of said n+1 bipolar plate assemblies, the anode of said one or said another of said n+1 bipolar plate assemblies being disposed adjacent said cathode of the other of said one or said another of said n+1 bipolar plate assemblies, and said alignment element engaging said bipolar plate assembly being installed;
   h) repeating steps f) and g) for the remaining number of provided bipolar plate assemblies and provided MEA elements to form a stack of n fuel cell units;
   i) applying compressive force to said stack of n fuel cell units whilst curing said curable liquid rubber material of said at least one of said elastomeric gasket and said at least one gasketing element to form a fuel cell sub-assembly module.

4. A method in accordance with claim 3 wherein said at least one elastomeric gasket includes a sealant that is liquid during said bipolar plate installing step.

5. A method in accordance with claim 3 wherein said at least one gasketing element includes a sealant that is liquid during said bipolar plate installing step.

6. A method in accordance with claim 3 wherein at least one of said membrane electrode assemblies includes gas diffusion layers.

7. A fuel cell assembly comprising a plurality of fuel cells bonded together to form a fuel cell sub-assembly module, wherein said fuel cell sub-assembly module is included in a plurality of fuel cell sub-assembly modules, wherein said plurality of fuel cell sub-assembly modules are bonded together to form said fuel cell assembly, wherein at least one of said fuel cells includes a bipolar plate assembly and a membrane electrode assembly, wherein at least one gasket and at least one gasketing element are positioned between at least two of said plurality of fuel cells, and wherein one of said at least one gasket or said at least one gasketing element is cured prior to bonding together said at least two of said plurality of fuel cells, and the other of said at least one gasket and said at least one gasketing element is cured during the boding together of said at least two of said plurality of fuel cells.

8. A fuel cell assembly comprising a plurality of fuel cells bonded together to form a fuel cell sub-assembly module, wherein said fuel cell sub-assembly module is included in a plurality of fuel cell sub-assembly modules, wherein said plurality of fuel cell sub-assembly modules are bonded together to form said fuel cell assembly, wherein at least one of said fuel cells includes a bipolar plate assembly and a membrane electrode assembly, wherein at least one gasket and at least one gasketing element are positioned between at least two of said plurality of fuel cell sub-assembly modules, and wherein one of said at least one gasket or said at least one gasketing element is cured prior to bonding together said at least two of said fuel cell sub-assemblies, and the other of said at least one gasket and said at least one gasketing element is cured during the bonding together of said at least two of said fuel cell sub-assembly modules.

9. A method in accordance with claim 3 wherein said at least one alignment element is a rod, wherein each of said bipolar plate assemblies include a bore, and wherein each of said bores receive said rod to align said bipolar plate assemblies.

10. A method in accordance with claim 1 wherein said at least one gasketing element has a thickness of no more than about 0.005 inches.

11. A method for forming a fuel cell assembly, comprising the steps of:
 a) forming a fuel cell sub-assembly module containing at least two bonded together fuel cell units, said at least two fuel cell units each including an anode, a cathode, and a membrane electrode assembly;
 b) testing said sub-assembly module; and
 c) joining together a plurality of sub-assembly modules to form said fuel cell assembly, wherein said plurality of sub-assembly modules are joined together using at least one elastomeric gasket and at least one gasketing element, and wherein one of said at least one elastomeric gasket or said at least one gasketing element is cured prior to joining together at least two of said plurality of sub-assembly modules, and the other of said at least one elastomeric gasket and said at least one gasketing element is cured during the joining together of said at least two of said plurality of sub-assembly modules.

12. A method in accordance with claim 11 wherein said at least one gasketing element has a thickness of no more than about 0.005 inches.

13. A fuel cell assembly in accordance with claim 7 wherein said at least one gasketing element has a thickness of no more than about 0.005 inches.

14. A fuel cell assembly in accordance with claim 7 wherein said membrane electrode assembly is positioned between at least one of said at least one gasket and said at least one gasketing element.

15. A fuel cell assembly in accordance with claim 8 wherein said at least one gasketing element has a thickness of no more than about 0.005 inches.

16. A fuel cell assembly in accordance with claim 8 wherein said membrane electrode assembly is positioned between at least one of said at least one gasket and said at least one gasketing element.

* * * * *